(12) United States Patent
Ito

(10) Patent No.: US 10,257,377 B2
(45) Date of Patent: Apr. 9, 2019

(54) PRINTING APPARATUS, CONTROL METHOD OF PRINTING APPARATUS, AND STORAGE MEDIUM

(71) Applicant: CANON KABUSHIKI KAISHA, Tokyo (JP)

(72) Inventor: Akio Ito, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/812,064

(22) Filed: Nov. 14, 2017

(65) Prior Publication Data
US 2018/0159999 A1 Jun. 7, 2018

(30) Foreign Application Priority Data
Dec. 2, 2016 (JP) .................. 2016-235026

(51) Int. Cl.
*H04N 1/00* (2006.01)
*H04N 1/333* (2006.01)

(52) U.S. Cl.
CPC ..... *H04N 1/00896* (2013.01); *H04N 1/33323* (2013.01); *H04N 2201/0094* (2013.01); *H04N 2201/3335* (2013.01)

(58) Field of Classification Search
USPC ....................................................... 358/1.14
See application file for complete search history.

(56) References Cited

U.S. PATENT DOCUMENTS

| | | | | |
|---|---|---|---|---|
| 2013/0308642 A1* | 11/2013 | Kimura | .................. | H04L 47/25 370/392 |
| 2013/0318383 A1* | 11/2013 | Takizawa | .............. | G06F 1/3234 713/323 |
| 2015/0134986 A1* | 5/2015 | Hasui | .................... | G06F 1/3209 713/320 |
| 2015/0261288 A1* | 9/2015 | Maruhashi | ............ | G06F 1/3287 358/1.14 |

FOREIGN PATENT DOCUMENTS

JP 2008-181402 A 8/2008
JP 2011-212946 A 10/2011

* cited by examiner

*Primary Examiner* — Ngon B Nguyen
(74) *Attorney, Agent, or Firm* — Venable LLP

(57) ABSTRACT

A printing apparatus includes a printer engine and a network interface. A first controller communicates with the network interface, and a second controller controls power supply to the printer engine and the first controller. The first controller, when the printing apparatus makes a transition to a power-saving state, causes the network interface to be in a first sleep state or a second sleep state from the normal operation state and instructs the second controller to stop power supply to the first controller. The second controller supplies power to the first controller when the printing apparatus resumes from the first sleep state, and supplies power to the first controller and the printer engine when the printing apparatus resumes from the second sleep state.

23 Claims, 11 Drawing Sheets

PRINTING APPARATUS, CONTROL METHOD OF PRINTING APPARATUS, AND STORAGE MEDIUM

BACKGROUND OF THE INVENTION

Field of the Invention

The present invention relates to resuming control from a power saving mode in a printing apparatus that is connected to a network.

Description of the Related Art

In a printing apparatus that is connected to a network such as a printer and a multi-function peripheral (MFP), reduction of power consumption during a waiting time has recently been promoted. The recent printing apparatuses typically include a power saving mode that energizes only to some of the units such as a network interface in the case where access or operation has not been made for a certain period of time. Moreover, in order to reduce the power consumption in the power saving mode, a technique of lowering the communication speed of the network at the time of a transition to the power saving mode is known. Further, a technique of stopping a clock signal between PHY and MAC on a condition that communication between the PHY and a hub is not made for a certain period of time under energy efficient Ethernet (EEE), which is a power saving technology standardized as IEEE802.3az, is known (Japanese Patent Laid-Open No. 2011-212946). In addition, a technique in which a network controller activates a printer engine based on part of data in a reception packet for urging the printer engine to activate rapidly at the time of receiving the packet is well known (Japanese Patent Laid-Open No. 2008-181402).

In the case of a technique disclosed in Japanese Patent Laid-Open No. 2008-181402 where determination is made based on a port number at the time of packet reception, there has been a problem in which the printer engine is caused to be activated even if the reception packet is associated with a job that does not include printing processing. In this regard, in the case of adopting the EEE, a time period required for resumption is short and thus the entire time period is less affected even if the printer engine is activated after the analysis of the reception packet to confirm that a job includes printing processing. Moreover, Japanese Patent Laid-Open No. 2011-212946 aims to obtain a remarkable power-saving effect by stopping the clock signal between the PHY and the MAC in accordance with the EEE, but a prompt activation of the printer engine upon resuming from the power saving mode is not considered.

An object of the present invention is to efficiently control the activation of the printer engine at the time of resumption from the power saving mode in the printing apparatus having an EEE function.

SUMMARY OF THE INVENTION

A printing apparatus of the present invention includes: a printer engine; a network interface capable of making a transition to: a normal operation state in which communication is made with an external apparatus in a first link speed, a first sleep state in which communication is made with the external apparatus in the first link speed and in which power is saved compared to power in the normal operation state, and a second sleep state in which communication is made with the external apparatus in a second link speed that is lower than the first link speed and in which power is saved compared to power in the normal operation state; a processor capable of communicating with the network interface; and a power control unit which stops power supply to the printer engine and the processor in response to fulfilling a condition of causing the printing apparatus to make a transition to a power-saving state. In the case where the printing apparatus makes a transition to the power-saving state, the processor changes a state of the network interface from the normal operation state to the first sleep state or the second sleep state.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
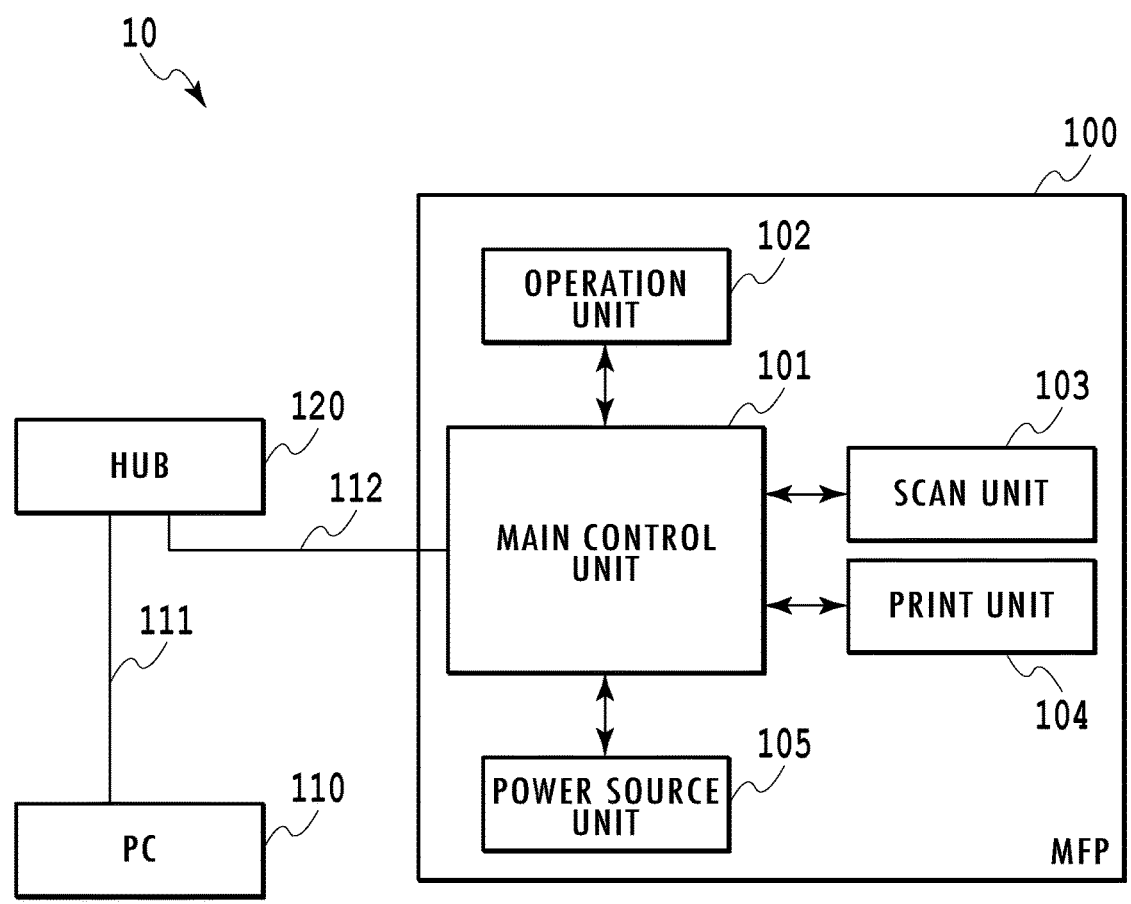
FIG. 1 is a block diagram showing a schematic configuration of a printing system.

FIG. 1 is a block diagram showing a schematic configuration of a printing system according to the present embodiment. A printing system 10 connects an MFP 100 and a PC 110 via a network 111 and a hub 120. Networks 111 and 112 are, for example, Ethernet (registered trademark). The PC 110 as an external apparatus is an information processing apparatus capable of giving instruction to print documents or the like to the MFP 100, and is communicably connected to the MFP 100. The MFP 100 as a printing apparatus is a multi-function peripheral capable of performing multiple functions such as a copy function, a print function, a scan function, and a FAX function. The MFP 100 includes a main control unit 101, an operation unit 102, a scan unit 103, a print unit 104, and a power source unit 105. The operation unit 102, scan unit 103, and print unit 104 are functional units that perform respective functions of the MFP 100, and the main control unit 101 is a control unit for controlling the functional units. The main control unit 101 is connected to the hub 120 via the network 112 to perform transmission and reception of data.

The operation unit 102 has hardware keys including a ten-key for inputting by a user the number of copies to be printed, a start key for giving an instruction to perform starting printing, and a power-saving key for changing the MFP 100 to a sleep mode. Further, the operation unit 102 has a display part (not shown) for displaying various information. This display part is, for example, a liquid-crystal display of a touch panel type. The scan unit 103 scans a document set on a non-illustrated document platen, converts an acquired image into digital data, and outputs the resultant to the main control unit 101. The print unit 104 has the printer engine of a certain printing type such as an electrophotographic printing type or an inkjet type, and forms, by the printer engine, an image on a printing medium such as paper based on image data that underwent predetermined image processing by the main control unit 101. The power source unit 105 converts an inputted AC voltage into a DC voltage via a non-illustrated power source plug to supply it to each of the units in the MFP 100.

Figure 2:
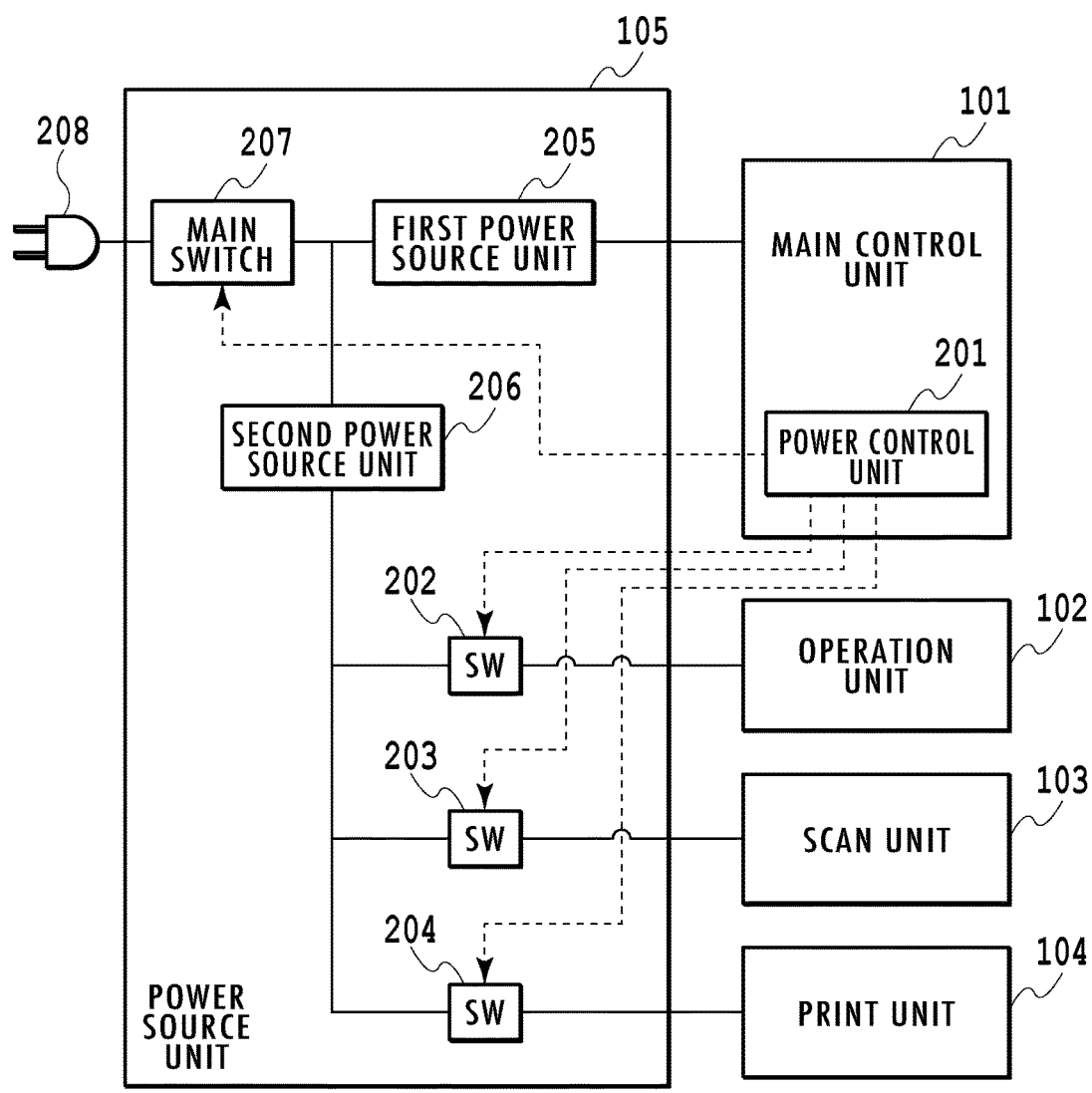
FIG. 2 is a block diagram showing a hardware configuration of a power control system in an MFP.

Next, a power control system in the MFP 100 will be explained. FIG. 2 is a block diagram showing a hardware configuration of a power control system in the MFP 100. In the power source unit 105, an AC voltage is inputted via a power source plug 208. The AC voltage inputted via the power source plug 208 is supplied to each of a first power source unit 205 and a second power source unit 206 via a main switch 207. The main switch 207 is a rocker switch, for example, and is switched between an off state and an on state in accordance with user's operation. The first power source unit 205 generates a DC voltage of 5.0 V, for example, from an inputted AC voltage. Meanwhile, the second power source unit 206 generates a DC voltage of 24.0 V, for example, from an inputted AC voltage. The DC voltage generated by the first power source unit 205 is supplied to the main control unit 101. Meanwhile, the DC voltage generated by the second power source unit 206 is supplied to the operation unit 102, the scan unit 103, and the print unit 104.

Between the second power source unit 206 and each of the functional units (i.e., the operation unit 102, scan unit 103, and print unit 104), relay switches 202 to 204 are provided. These relay switches 202 to 204 are individually controlled on/off by a power control unit 201 in the main control unit 101. Also, the power control unit 201 can drive a non-illustrated solenoid to switch the main switch 207 on/off.

Figure 3:
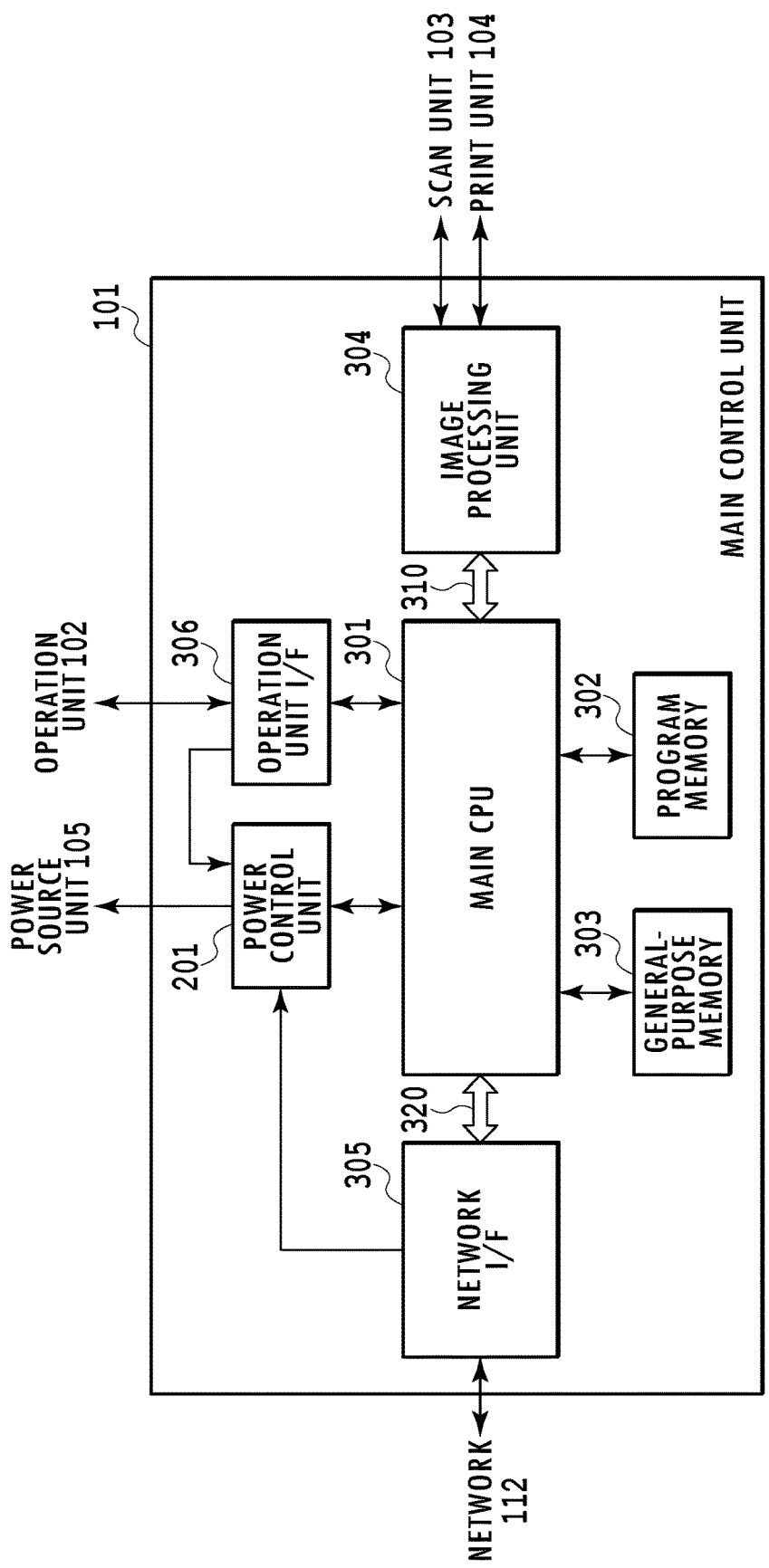
FIG. 3 is a block diagram showing a hardware configuration of a main control unit.

Next, the details of the main control unit 101 will be explained. FIG. 3 is a block diagram showing a hardware configuration of the main control unit 101. The main control unit 101 includes a main CPU 301, a program memory 302, a general-purpose memory 303, an image processing unit 304, a network interface 305, an operation unit interface 306, and the above-described power control unit 201.

The main CPU 301 is connected to the image processing unit 304 via a PCI bus (data transmission path) 310. Also, the main CPU 301 is connected to the network interface 305 via a PCI bus (data transmission path) 320. The PCI buses 310 and 320 are buses in accordance with PCI Express standard, and the image processing unit 304 and the network interface 305 are PCI devices adapted to the PCI Express standard.

The main CPU 301 is a processor that includes an interface circuit for communicating with peripheral devices, and centralizedly controls the MFP 100. The program memory 302 is a flash memory, for example, and programs for controlling the MFP 100 and control data are stored therein. The main CPU 301 develops a program loaded from the program memory 302 in the general-purpose memory 303 for execution. The general-purpose memory 303 is used as a work memory for the main CPU 301 and temporarily stores image data or the like relating to a copy job or a print job.

The image processing unit 304 is communicably connected to the scan unit 103 and the print unit 104, and performs image processing on scanned image data read by the scan unit 103 and image processing on image data to be processed for printing by the print unit 104. The network interface 305 is an expansion board such as a network interface card (NIC), and controls communications with the PC 110 for exchanging data such as a packet. The operation unit interface 306 is an interface for connecting between the operation unit 102 and the main CPU 301, and transmits, to the main CPU 301, information associated with a user's key operation or touch panel operation through the operation unit 102. In addition, the operation unit interface 306 transmits, to the operation unit 102, screen data for displaying it on the display part.

The power control unit 201 is a logic circuit that controls power supply to each of the units in the MFP 100. The power control unit 201 resumes the MFP 100 from a sleep mode in accordance with a user's input through the operation unit 102 or an interrupt signal caused by packet data reception or the like from the PC 110 via the network interface 305. It should be noted that the interrupt signal inputted to the power control unit 201 includes, other than the above, a detection signal which represents detecting a printing paper outputted from the print unit 104, a detection signal which represents detecting a document outputted from the scan unit 103, and a detection signal which represents detecting a human body outputted from a non-illustrated human body sensor unit.

Figure 4:
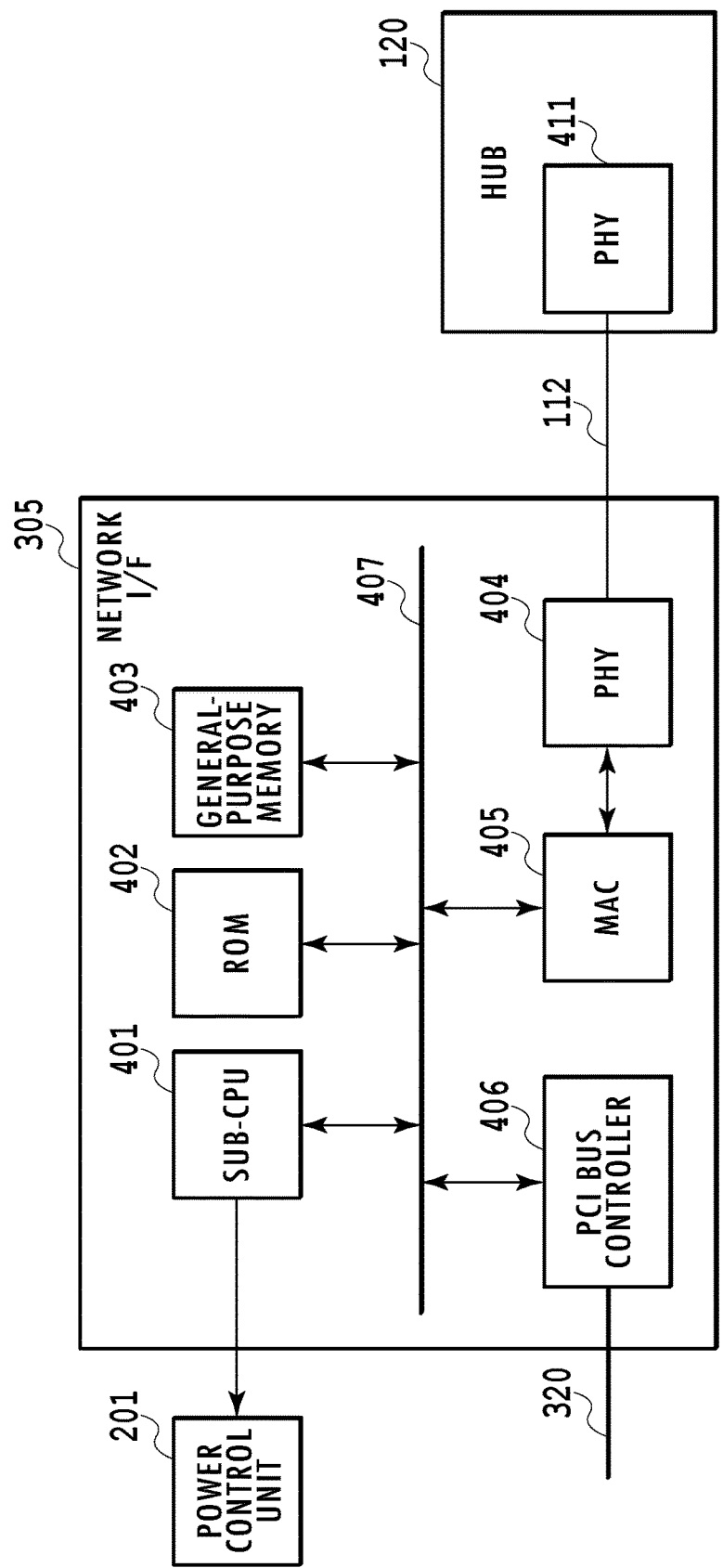
FIG. 4 is a block diagram showing a configuration inside a network interface.

Next, the network interface 305 will be explained in detail. FIG. 4 is a block diagram showing a configuration inside the network interface 305. The network interface 305 includes a sub-CPU 401, a ROM 402, a general-purpose memory 403, PHY 404, MAC 405, and a PCI bus controller 406, and these are mutually connected via a system bus 407. It should be noted that the network interface 305 may be provided on the same board as the board of the main control unit 101, or may be provided on another board.

The sub-CPU 401 is a processor to control the network interface 305. The ROM 402 stores various programs for controlling the network interface 305. The general-purpose memory 403 is a read/write memory, and is used by the sub-CPU 401 to execute various programs. The PHY 404 is a physical layer for electrically exchanging signals with a connected target in the case of connecting the PHY 404 to the network 112. The PHY 404 is connected to Ethernet, which is a representative standard of the network interface, via the MAC 405. The MAC (media access control) 405 converts a signal received via the PHY 404 into a frame handled by the device in the apparatus. Further, the network interface 305 includes a non-illustrated DMA circuit, which allows data received from the network 112 to be DMA-transferred to the general-purpose memory 403. Also, the DMA transfer allows data existing in the general-purpose memory 403 to be transmitted to the network 112.

In the present embodiment, the PHY 404 is adapted to a low power idle (LPI) of the EEE. In the case where the transmission/reception of a packet has not been made for a predetermined time period in the PHY 404, the LPI is a function to stop some of the functions in the PHY 404 and the MAC 405 to suppress power consumption. The LPI has advantages such that it can maintain network links without changing the communication speed of the PHY 404 and a time period required for resumption is short (approximately 10 μsec). As a condition of making the LPI effective, it is required that a PHY 411, to which the PHY 404 is connected, in the hub 120 be similarly adapted to the EEE and that both the PHY 411 and the PHY 404 set their EEE functions available.

The PCI bus controller 406 accesses the general-purpose memory 403 and the ROM 402 via the system bus 407. It should be noted that the network interface 305 according to the present embodiment has the PCI bus controller 406 and is connected to a PCI bus 320, but a configuration of connecting to a bus of a standard other than that of the PCI bus may also be adopted.

Now, exchanges between the PHY 404 in the network interface 305 and the PHY 411 in the hub 120 will be explained. Once the MFP 100 is activated, the PHY 404 and the PHY 411 start transmitting/receiving a fast link pulse (FLP). The FLP is a signal for notifying the PHY to be connected of setting information, such as a maximum communication speed, which is required to determine a communication mode after link establishment with the PHY. In addition, in the case where the PHY is adapted to the EEE, information relating to EEE enabled/disabled setting is also exchanged through the FLP. Next, the PHY 404 and the PHY 411 perform auto-negotiation based on the transmitted/received FLP. Thereafter, settings for the PHY including a communication speed and the EEE enabled/disabled setting are determined to establish a link. The communication speed in this case is generally set to a communication speed that is common and maximum between the PHY 404 and the PHY 411 out of communication speeds presented in the exchanged FLP. It should be noted that, in the present embodiment, the communication speed of the PHY 404 is set among 1000 Mbps, 100 Mbps, and 10 Mbps. In general, the power consumption of the PHY 404 and MAC 405 varies according to the communication speed set for the PHY 404. The power consumption reaches the maximum in the case where the communication speed for the PHY 404 is set to 1000 Mbps, whereas the power consumption reaches the minimum in the case where the communication speed therefor is set to 10 Mbps.

As described above, the FLP also includes information whether the setting is EEE-available. Accordingly, in the case where both the PHY 404 and PHY 411 have the settings in which the EEEs are available, the function of the EEE is enabled as a result of the auto-negotiation. In the case where either the PHY 404 or PHY 411 does not have the setting in which the EEE is available, the function of the EEE is disabled. As such, once a link between the PHY 404 and the PHY 411 is established, the transmission/reception of a packet between them is allowed. It should be noted that, upon transmitting/receiving the FLP, all the available communication speeds for the setting in the PHY are generally notified, but it is also possible to set communication speeds to be notified to the PHY in advance. For instance, based on management information from the sub-CPU 401, the speed of 1000 Mbps, for example, is set to be disabled as one of the available communication speeds for the setting in the PHY 404. As a result, only the available communication speeds that are effective for the setting (e.g., 100 Mbps and 10 Mbps) are notified to the opponent by the FLP.

Figure 5:
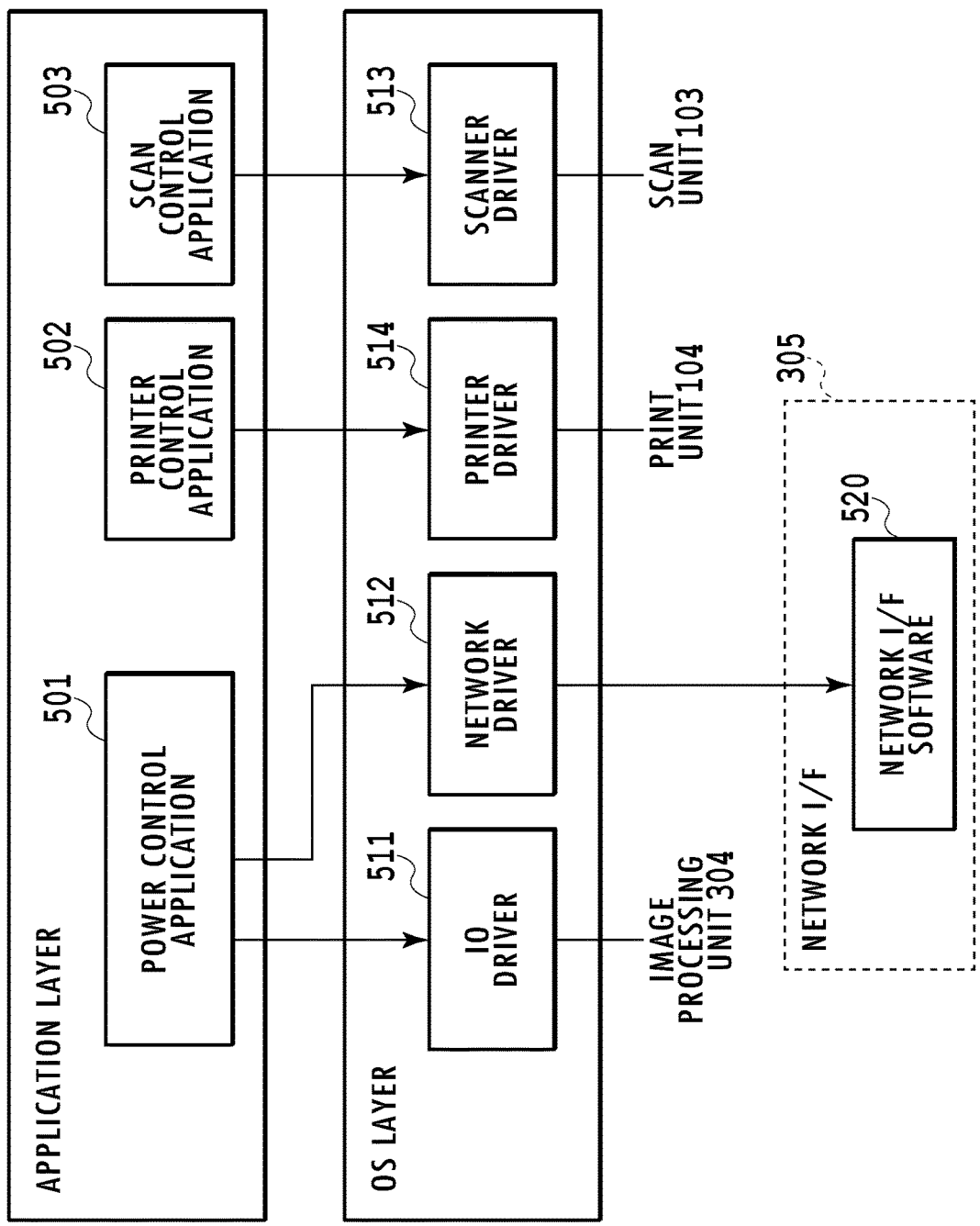
FIG. 5 is a block diagram showing a software configuration of the main control unit.

Next, a software configuration of the main control unit 101 will be explained. FIG. 5 is a block diagram showing the software configuration of the main control unit 101. In the block diagram, each of control applications in an application layer and each of device drivers in an OS layer achieve their functions by executing respective predetermined programs by the main CPU 301, whereas network controller software achieves its function by executing a predetermined program by the sub-CPU 401.

A power control application 501 is application software that controls power in the MFP 100, and is operated in the application layer. The power control application 501 periodically inquires about the state of job execution and the like to a printer control application 502, a scan control application 503, and the like which are also operated in the application layer, and based on its result, an operation mode in the MFP 100 is controlled. To be more specific, the main CPU 301 or the sub-CPU 401 instructs the power control unit 201 to supply or stop power to each of the units and changes the operation modes of the MFP 100. Further, the power control application 501 notifies an IO driver 511 and a network driver 512 which is operated in the OS layer of information on the operation mode of the MFP 100.

The network driver 512 relays the communication between a network I/F software 520 that controls the network interface 305 and the power control application 501 by using a communication interface specification of the network interface 305. It should be noted that various software executed in the application layer and the OS layer are not limited to the ones shown in the drawing. Various other types of software such as a graphic driver that controls display on the display part of the operation unit 102 are in operation as well.

The device drivers in the OS layer control power supply to each of the units in the MFP 100 based on information regarding the operation mode notified from the power control application 501. For instance, if the notified operation mode is a standby mode, the IO driver 511 continues supplying power to the scan unit 103 and the print unit 104 via the power control unit 201 to maintain the standby mode. Alternatively, if the notified operation mode is a wait-and-respond mode, the power supply to the scan unit 103 and the print unit 104 via the power control unit 201 is stopped. It should be noted that, in the present embodiment, there are four operation modes, that is, the standby mode, the wait-and-respond mode, the sleep mode, and a power-off mode. The details of these modes and the transition between these modes will be described later.

Figure 6:
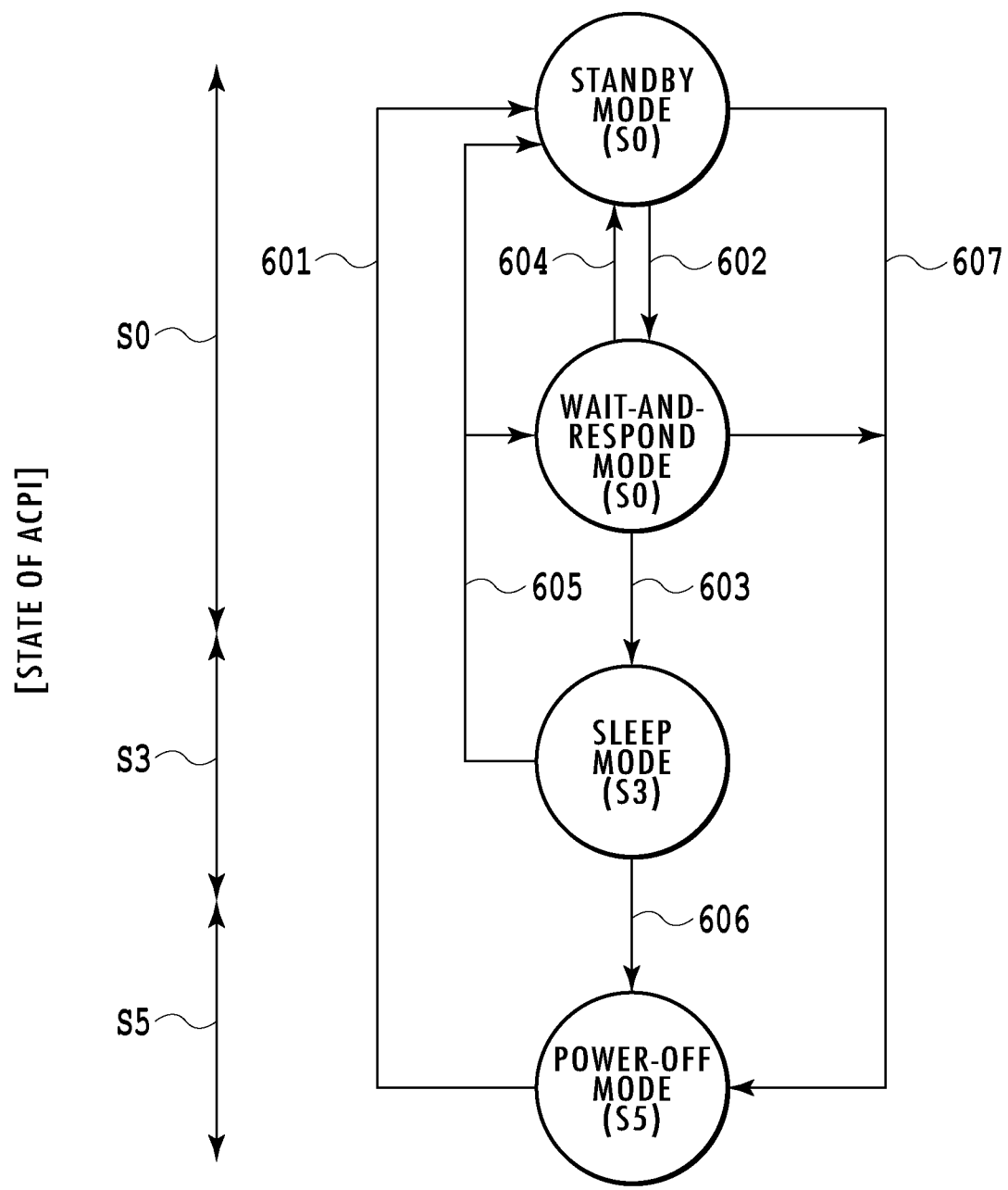
FIG. 6 is a diagram showing the relation between four operation modes in the MFP and the state of an ACPI.

Next, the relation between the operation mode of the MFP 100 and the state of an advanced configuration and power interface (ACPI) which is a standard of power management will be explained. FIG. 6 is a diagram showing the relation between four operation modes in the MFP 100 and the state of the ACPI. The MFP 100 according to the present embodiment has any one of an S0 state, S3 state, and S5 state defined in the ACPI standard. The S0 state is a state in which power is supplied to the major units in the MFP 100 including the main CPU 301 of the main control unit 101. The S3 state is sometimes called as a suspended state. In the S3 state, information regarding the state of the main CPU 301 in the main control unit 101 is retracted to the general-purpose memory 303 and then the power supply to the main CPU 301 is stopped, and only the power for some part that is required for a restart such as the general-purpose memory 303 is maintained. The S5 state is a state in which the power supply to all major units in the MFP 100 including the main CPU 301 is stopped. In other words, each of the states according to the present embodiment is defined as follows.

S0 state: a state in which power is supplied to the major units of the MFP 100 including the main CPU 301 (normal operation state)

S3 state: a state in which power supply to the main CPU 301 is stopped, and power supply only to some parts such as a main memory (general-purpose memory 303) is maintained (sleep state)

S5 state: a state in which power supply to the entire MFP 100 including the main CPU 301 and the main memory is stopped (stopped state)

Further, the power states of the MFP 100 are: fully supplied in the standby mode, power saved in the wait-and-respond mode or sleep mode, and power stopped in the power-off mode. The operation mode of the MFP 100 in each of the states and the state of power will be explained below in detail.

<S0 State (Normal Operation State)>

The MFP 100 has a mode of stopping power supply to predetermined functional units under the S0 state in which power is supplied to the main CPU 301. For instance, in the case where a copy job or a print job is executed, power should be supplied to, in addition to the main CPU 301, the scan unit 103 and the print unit 104. On the other hand, in the case of responding to an inquiry job from the PC 110, only the main CPU 301 should be activated, and there is no need to activate the scan unit 103 and the print unit 104. Thus, the MFP 100 according to the present embodiment has two types of modes for the operation mode under the S0 state, that is, the standby mode in which power is supplied to the scan unit 103 and the print unit 104 and the wait-and-respond mode in which power supply to the scan unit 103 and the print unit 104 is stopped. In the case of the standby mode, power is supplied to all of the major units in the MFP 100, that is, the main control unit 101, the operation unit 102, the scan unit 103, and the print unit 104. Meanwhile, in the case of the wait-and-respond mode, power is supplied to the main control unit 101 and the operation unit 102, but not to the scan unit 103 or the print unit 104. It should be noted that power supply to the operation unit 102 in the wait-and-respond mode is not essential and may be stopped.

<S3 State (Sleep State)>

In the S3 state in which power supply to the main CPU 301 is stopped, information regarding the state of the main CPU 301, for example, is, as described above, retracted to the general-purpose memory 303. At this time, the general-purpose memory 303 is in a so-called self-refresh mode. In the case of resumption from the S3 state, it is possible to resume the MFP using such state information retracted to the general-purpose memory 303 in high speed compared to the activation from a boot ROM. Under the S3 state, power supply to the operation unit 102, the scan unit 103, and the print unit 104, in addition to the main CPU 301, is stopped. As a result, a display on the display part of the operation unit 102 is off, and a power-saving state waiting for the input of an activation signal is established. In this S3 state, power supply to the network interface 305 also continues so as to make control in accordance with the EEE enabled/disabled setting.

<S5 State (Stopped State)>

Upon turning off the main switch 207 in the standby mode and the wait-and-respond mode, a transition is made to the power-off mode. This state is the S5 state, and power supply to the entire MFP 100 is stopped.

The relation between the on/off of the major units in the MFP 100 and the operation modes, the states of power, and the states of ACPI is summarized in Table 1 below.

TABLE 1

| | Operation Modes | | | |
|---|---|---|---|---|
| | Power-off mode | Sleep mode | Wait-and-respond mode | Standby mode |
| | States of Power | | | |
| | Stop Supply | Power Saving (High power-saving level) | Power Saving (Low power-saving level) | Full Supply |
| | States of ACPI | | | |
| | S5 (Stop State) | S3 (Sleep State) | S0 (Normal Operation State) | |
| Scanner Unit | OFF | OFF | OFF | ON |
| Printer Unit | OFF | OFF | OFF | ON |
| Operation Unit | OFF | OFF | ON | ON |
| Main CPU | OFF | OFF | ON | ON |
| Network I/F | OFF | ON | ON | ON |

The transition of the operation mode (power state) in the MFP 100 will be explained below with reference to FIG. 6.

<Power-Off Mode→Standby Mode>

Once the main switch 207 is turned on, as indicated by an arrow 601, a transition is made from the power-off mode in the state S5 to the standby mode in the state S0.

<Standby Mode→Wait-and-Respond Mode>

In the case where any of the conditions, that is, the lapse of a predetermined time period, pressing of a predetermined switch, and time setting in the standby mode is fulfilled, a transition is made to the wait-and-respond mode as indicated by an arrow 602. Here, the lapse of a predetermined time period refers to a case where an elapsed time from the completion of a user's operation through the operation unit 102 or an elapsed time from the end of copy job processing exceeds a time period preset by the user (a few minutes to a few hours). The predetermined switch is a power-saving key (not shown) provided on the operation unit 102, and upon detecting the user's pressing, a transition is made to the wait-and-respond mode. The time setting is a case where a current time counted by a clock part (not shown) reaches a time preset by the user (e.g., 20:00).

<Wait-and-Respond Mode→Sleep Mode>

In the case where either of the conditions, that is, the lapse of a predetermined time period and the end of inquiry job processing in the wait-and-respond mode is fulfilled, a transition is made to the sleep mode as indicated by an arrow 603. Here, the lapse of a predetermined time period is a case where an elapsed time from the end of job processing using the print unit 104 exceeds a time period preset by the user (a few minutes to a few hours). The end of inquiry job processing is a case where response to the inquiry from the PC 110 is completed.

<Wait-and-Respond Mode→Standby Mode>

In the case where any of the conditions, that is, pressing of a predetermined switch, receiving a print job, and time setting in the wait-and-respond mode is fulfilled, a transition is made to the standby mode as indicated by an arrow 604. The predetermined switch in this case is any keys on the operation unit 102 including the above-described power-saving key, and upon detecting user's key operation, a transition is made to the standby mode. Further, this also includes a case where a user makes authentication operation using an ID card, for example, or a case where the user sets copy operation. In addition, receiving a print job is a case of receiving the print job from the PC 110 via the networks 111 and 112. The time setting is as described above. The conditions of resumption from the wait-and-respond mode to the standby mode are not limited to the above cases, and may also include a case where a document detection sensor, for example, in the scan unit 103 detects a document placed on the document platen and a case where the sensor detects paper placed on a manually-fed paper tray of the print unit 104.

<Sleep Mode→Wait-and-Respond Mode/Standby Mode>

In the case where any of the conditions, that is, pressing of a predetermined switch, receiving a print job, receiving a specific inquiry job, and time setting under the sleep mode is fulfilled, a transition (resumption) is made to the wait-and-respond mode or the standby mode as indicated by an arrow 605. For instance, once the power-saving key (not shown) on the operation unit 102 is pressed, a transition is made to the wait-and-respond mode. Also, once a print job is received from the PC 110 via the networks 111 and 112, a transition is made to the standby mode. The specific inquiry job refers to a job that inquires information of the MFP 100 (hereinafter referred to as "device information") from the PC 110, which is an inquiry job that cannot be responded by the network interface 305. The time setting is as described above. Once any of the above-described resumption conditions is fulfilled in the sleep mode, an interrupt signal is inputted to the power control unit 201. Once the interrupt signal is inputted, the power control unit 201 supplies power, in accordance with the type of interrupt signal, to each of functional units, specifically, the main CPU 301, the program memory 302, the print unit 104, and the like. Upon receiving the power supply, the main CPU 301 performs resume processing using the information retracted to the general-purpose memory 303. Further, once the interrupt signal along with print job reception from the network interface 305 to the power control unit 201 is inputted, a relay switch 204 is controlled to supply power to the print unit 104, in addition to the main CPU 301 and the general-purpose memory 303, and a transition is made to the standby mode.

<Sleep Mode→Power-Off Mode>

In the case where either of the conditions, that is, pressing of the main switch 207 and the lapse of a predetermined time period in the sleep mode is fulfilled, a transition is made to the power-off mode as indicated by an arrow 606. The pressing of the main switch 207 is a case where the user operates the main switch 207 to turn it from on to off. Meanwhile, the lapse of a predetermined time period refers to a case where a time period preset by the user (a few minutes to a few hours) has elapsed in the state of the sleep mode.

<Wait-and-Respond Mode/Standby Mode→Power-Off Mode>

Once the user operates the main switch 207 to turn it off in the wait-and-respond mode or the standby mode, a transition is made to the power-off mode as indicated by an arrow 607. It should be noted that the power-off mode may be a suspended state (the S3 state of the ACPI standard) or may be a hibernation state (the S4 state of the ACPI standard).

Figure 7:
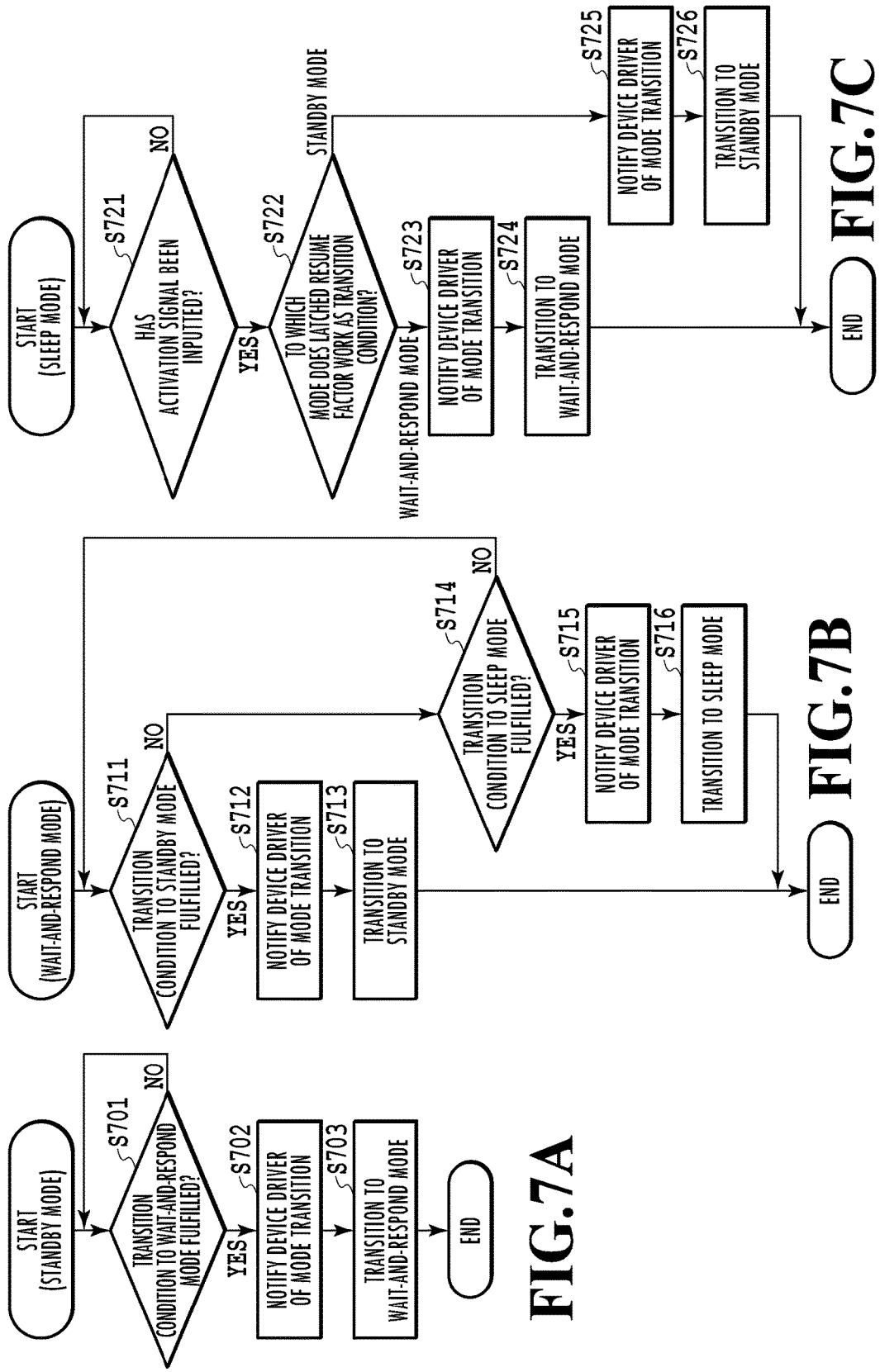
FIGS. 7A to 7C are flowcharts each showing the flow of mode transition control by a power control application.

Next, power control (mode transition control) by the power control application 501 will be explained. FIGS. 7A to 7C are flowcharts each showing the flow of mode transition control by the power control application 501. Each of these flows will be explained below.

FIG. 7A is a flowchart showing the flow of transition control from the standby mode to the wait-and-respond mode. In Step 701, determination is made as to whether any of the above-described transition conditions to the wait-and-respond mode is fulfilled. In the case where one of the transition conditions to the wait-and-respond mode is fulfilled, the process proceeds to Step 702. Meanwhile, in the case where none of the transition conditions to the wait-and-respond mode is fulfilled, monitoring continues. In Step 702, the transition to the wait-and-respond mode is notified to the IO driver 511 and the network driver 512. Upon receiving this notification, the network driver 512 notifies the network I/F software 520 of the same content. Then, in Step 703, the CPU 301 instructs the power control unit 201 to stop power supply to the scan unit 103 and the print unit 104. As a result, the power supply to the scan unit 103 and the print unit 104 is interrupted, and a transition to the wait-and-respond mode is completed.

FIG. 7B is a flowchart showing the flow of transition control from the wait-and-respond mode to the standby mode or the sleep mode. In Step 711, determination is made as to whether either of the above-described transition conditions to the standby mode is fulfilled. In the case where one of the transition conditions to the standby mode is fulfilled, the process proceeds to Step 712. Meanwhile, in the case where none of the transition conditions to the standby mode is fulfilled, the process proceeds to Step 714. In Step 712, the transition to the standby mode is notified to the IO driver 511 and the network driver 512. Upon receiving this notification, the network driver 512 notifies the network I/F software 520 of the same content. Then, in Step 713, power supply to the scan unit 103 and the print unit 104 is instructed to the power control unit 201. In such a case, the instruction is given by the main CPU 301 in the case where the pressing of the power-saving key is detected, while the instruction is given by the network interface 305 in the case where a print job or the like is received from the network 112. As a result, the power supply to the scan unit 103 and the print unit 104 restarts, and the transition to the standby mode is completed. In Step 714, determination is made as to whether any of the above-described transition conditions to the sleep mode is fulfilled. In the case where one of the transition conditions to the sleep mode is fulfilled, the process proceeds to Step 715. Meanwhile, in the case where none of the transition conditions to the sleep mode is fulfilled, the process returns to Step 711 to repeat the processing. In Step 715, the transition to the sleep mode is notified to the IO driver 511 and the network driver 512. Upon receiving this notification, the network driver 512 notifies the network I/F software 520 of the same content. Then, in Step 716, the main CPU 301 instructs the power control unit 201 to stop power supply to the main CPU 301 itself. As a result, the power supply to the main CPU 301 is interrupted, and a transition to the sleep mode is completed.

FIG. 7C is a flowchart showing the flow of transition control from the sleep mode to the wait-and-respond mode or the standby mode. In Step 721, determination is made as to whether resumption from the sleep mode has been detected. To be more specific, the determination is made as to whether an activation signal is inputted from the operation unit 102 or the network interface 305 to the power control unit 201. Once the activation signal is inputted, a resume factor is latched to the power control unit 201 to supply power to the main CPU 301. In Step 722, determination is made as to whether the latched resume factor is a transition condition to the wait-and-respond mode or a transition condition to the standby mode. In the case where the latched resume factor is the transition condition to the wait-and-respond mode, the process proceeds to Step 723. Meanwhile, in the case where the latched resume factor is the transition condition to the standby mode, the process proceeds to Step 725. In Step 723, the transition to the wait-and-respond mode is notified to the IO driver 511 and the network driver 512. Upon receiving this notification, the network driver 512 notifies the network I/F software 520 of the same content. Then, in Step 724, the main CPU 301 instructs the power control unit 201 to supply power to each of the units other than the scan unit 103 and the print unit 104. As a result, the power supply to the major units other than the scan unit 103 and the print unit 104 restarts, and the transition to the wait-and-respond mode is completed. In Step 725, the transition to the standby mode is notified to the IO driver 511 and the network driver 512. Upon receiving this notification, the network driver 512 notifies the network I/F software 520 of the same content. Then, in Step 726, the main CPU 301 instructs the power control unit 201 to supply power to the major units including the scan unit 103 and the print unit 104. As a result, the power supply to the major units including the scan unit 103 and the print unit 104 restarts, and the transition to the standby mode is completed.

The above descriptions are the content of the mode transition control by the power control application 501.

Next, the details of control in the network interface 305 will be explained. There are mainly two types for processing performed by the network interface 305. One is processing of operation mode transition for the MFP 100 and the other is processing of receiving packet from the network 112.

Figure 8:
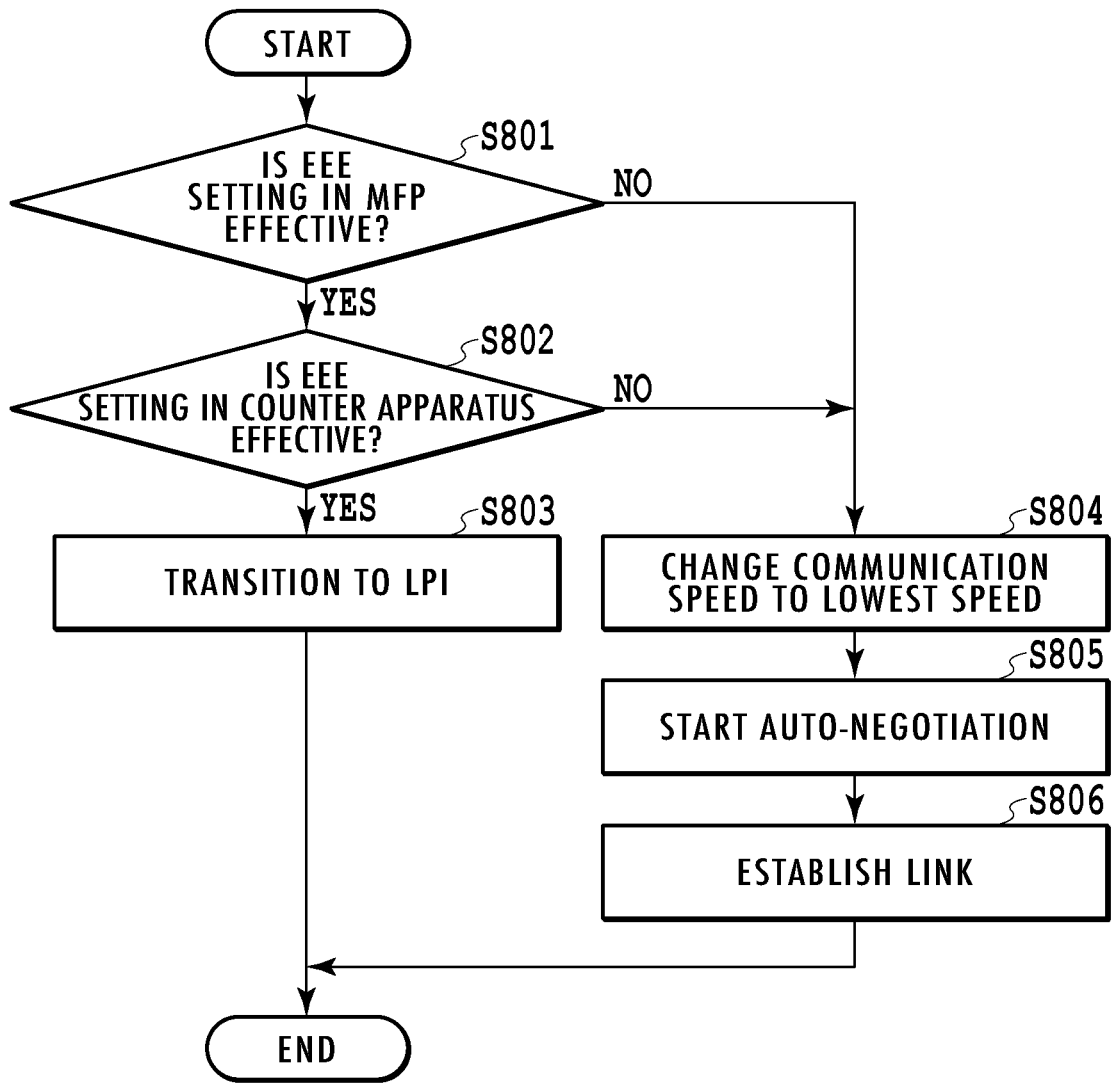
FIG. 8 is a flowchart showing the details of transition control to a sleep mode in the network interface.

First of all, processing of operation mode transition will be explained. This processing is made, as in Step 702 and the like in the flows shown in the above-described FIGS. 7A to 7C, at the time of receiving notification of a mode transition from the main CPU 301 via the network driver 512. Here, an explanation on mode transition control in receiving the notification of the transition to the sleep mode, which is a significant feature of the present embodiment, will be given, and an explanation on the transition control between other modes will be omitted. FIG. 8 is a flowchart showing the details of transition control to the sleep mode in the network interface 305.

In the case where the notification of the operation mode transition received from the main CPU 301 via the network driver 512 indicates a transition to the sleep mode, determination is made, in Step 801, as to whether the EEE setting in the MFP 100 is effective. The EEE setting is selectable, by a user through the operation unit 102, between using (enabling) or not using (disabling) the EEE function, and setting information in accordance with the user selection is held in the general-purpose memory 403. By referring to this setting information, it is possible to determine the EEE enabled/disabled setting. In the case where the EEE is set to be enabled, the process proceeds to Step 802. Meanwhile, in the case where the EEE is set to be disabled, the process proceeds to Step 804.

In Step 802, determination is made as to whether the EEE setting is effective in the hub 120, as a counter apparatus, connected via the network 112. The state of the EEE enabled/disabled setting in the counter apparatus is updated for every auto-negotiation. In the case where the EEE is set to be disabled in the hub 120 or where the hub 120 is not adapted to the EEE in the first place, it is determined that the EEE setting is not effective. In this step, such determination is made based on the updated EEE setting information of the hub 120 which is held in the general-purpose memory 403. As a result of the determination, if the EEE setting of the hub 120 is effective, the process proceeds to Step 803. Meanwhile, if the EEE setting of the hub 120 is not effective, the process proceeds to Step 804.

In Step 803, a transition to the LPI is set in the PHY 404 via the MAC 405. Then, if packet transmission via the network 112 is not made for a predetermined time period, transition is made to the LPI. In other words, while a communication speed is kept to be high (first link speed), some functions of the PHY 404 and the MAC 405 are stopped to make a transition to the sleep state (S3), which saves power more than that in the normal operation state (S0). Hereinafter, the state of this LPI is referred to as a "first sleep state." In the LPI, the PHY 404 makes transitions among four states, that is, a "Sleep," "Quiet," "Refresh," and "Wake." The "Sleep" state represents the start of a transition to the LPI. The "Refresh" state represents operation for maintaining a link, and predetermined data transmission is made via the network 112. The "Quiet" state represents a halt, and the above-described predetermined data transmission for maintaining the link is also stopped. Moreover, the "Quiet" state and the "Refresh" state are periodically (e.g., approximately 20 ms for "Quiet" and approximately 200 μs for "Refresh") repeated to achieve power saving and link maintenance at the same time. The "Wake" state represents resumption from the LPI to the normal operation state (S0). After making a transition to the LPI, transitions are to be made among the above four states, but the state is mostly in the "Quiet" state in terms of their time ratios. Moreover, in the state of "Quiet," most of the circuits in the PHY 404 and the MAC 405 are stopped. Out of those, a circuit that serves data transmission and reception with large power consumption during operation is included, and therefore, the state of "Quiet" can achieve great effect in power reduction. Further, controlling operation circuits in accordance with the transition states allows reducing further power. To be more specific, further power saving can be achieved by operating only a circuit of monitoring the transition states, a circuit of counting time in each transition, and a circuit of detecting a transition to the next transition state, while the other circuits are frequently controlled so as to stop their operations.

In the case where the EEE setting is determined not to be effective in the network interface 305 itself or the hub 120, a communication speed in the network 112 is set, in Step 804, to a speed in which power consumption associated with communications is the lowest. Thereafter, in Step 805, auto-negotiation is performed by the PHY 404. At the completion of the auto-negotiation, the PHY 404 establishes, in Step 806, a link with the PHY 411 at a communication speed (low speed) determined by the auto-negotiation. As such, in the case where the EEE setting is not effective in both of the PHYs, a transition is made to the sleep state (S3) in which the communication speed is changed to a low speed (second link speed). Hereinafter, the power-saving sleep state (S3) in which the link is maintained in this low speed is referred to as a "second sleep state."

The above is the content of transition control to the sleep mode in the network interface 305. Take note that there are two types of methods for making a transition to the LPI. One is a method of notifying the counter apparatus that the EEE setting is effective (EEE adaptation notification) and permitting a transition to the LPI at the same time (simultaneous execution), and the other is a method of notifying the counter apparatus of the EEE adaptation and permitting a transition to the LPI at a separate timing (separate execution). The outline of each of the methods will be described below.

First of all, in the simultaneous execution, the transition to the LPI is permitted at the time at which the EEE adaptation is notified to the counter apparatus through auto-negotiation. Accordingly, in an initial auto-negotiation at the time of the MFP 100 activation, the state of not being adapted to the EEE is notified to the counter apparatus. Then, upon making a transition to the sleep mode (i.e., after the transition to the LPI has been determined), the EEE setting is enabled to perform auto-negotiation with the counter apparatus again, and the adaptation to the EEE is notified to a linked destination to make a transition to the LPI.

Next, in the separate execution, the EEE adaptation is notified to the counter apparatus through auto-negotiation. However, at this timing, the PHY 404 is not permitted to make a transition to the LPI, but is permitted to make the transition upon making a transition to the sleep mode. In the case where an idling state in which no processing is made for a predetermined time period is detected, the PHY 404 makes the transition to the LPI. In the case of using this method, there is no need to perform the auto-negotiation again. The separate execution has been explained as an example in the present embodiment, but the simultaneous execution may also be used.

Figure 9:
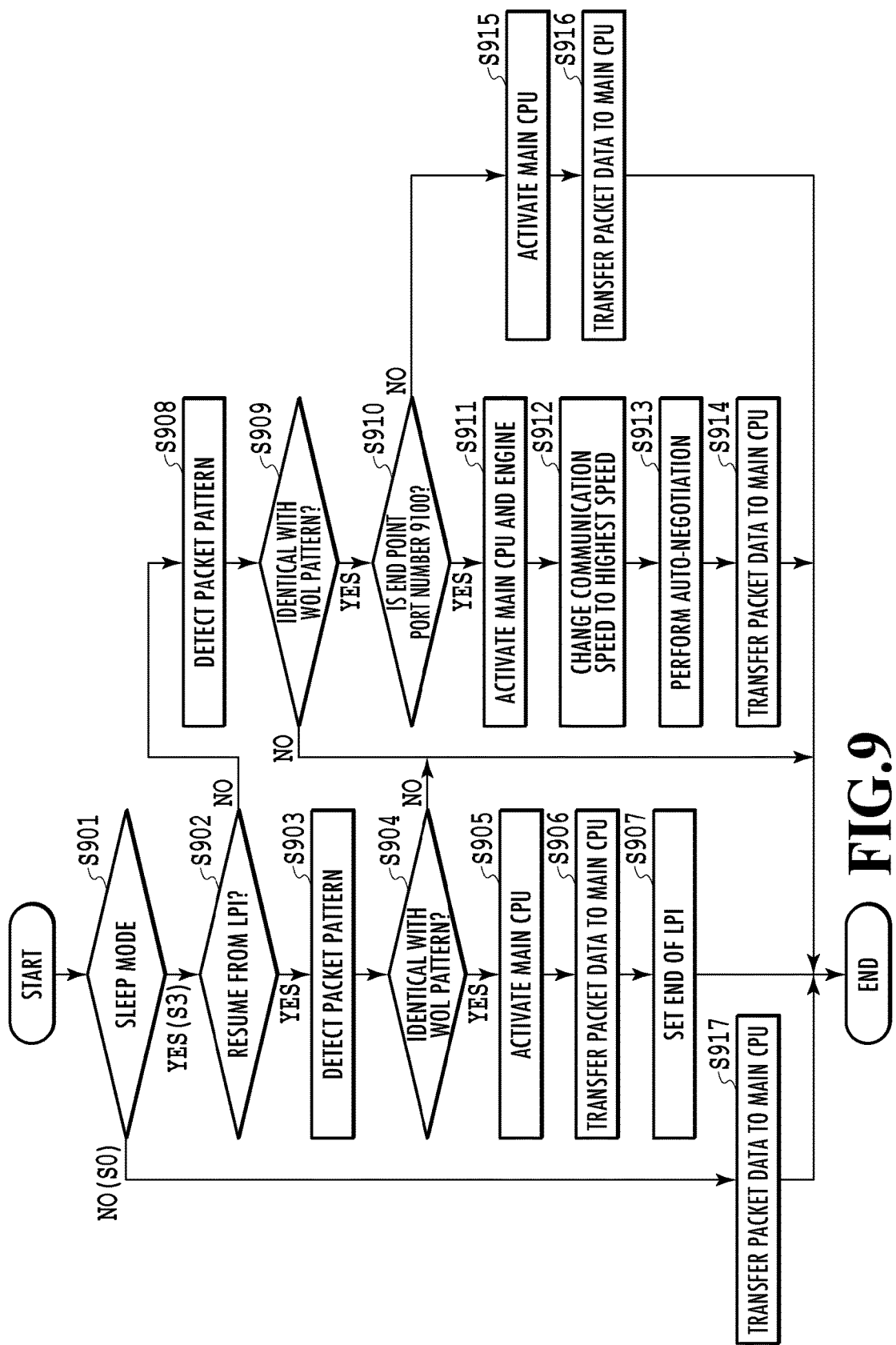
FIG. 9 is a flowchart showing the details of packet reception processing according to a first embodiment.

Next, packet reception processing at the time at which the network interface 305 receives a packet from the network 112 will be explained. In the case of the packet reception processing according to the present embodiment, a packet analysis relating to printing processing having a high processing load is controlled to be performed by the CPU 301. Meanwhile, the sub-CPU 401, whose power is continuously supplied even in the sleep mode, detects a destination port number included in a packet and makes control so as to activate the printer engine in an early stage in the case where a reception packet represents a job that requires printing processing. In other words, in light of the feature of the sub-CPU 401 whose processing performance is not so high and whose power is low at the standby state and the feature of the main CPU 301 whose processing performance is high and whose power is high at the standby state, power reduction during standby state and processing time reduction are well balanced and efficient resume control is achieved. FIG. 9 is a flowchart showing the details of packet reception processing according to the present embodiment. The details will be explained below along the flow shown in FIG. 9.

First of all, in Step 901, determination is made as to whether the operation mode at the time of packet reception is the sleep mode (S3 state). If the operation mode is the sleep mode, the process proceeds to Step 902. Meanwhile, if the operation mode is other than the sleep mode, that is, either the wait-and-respond mode or the standby mode (S0 state), the process proceeds to Step 917.

In Step 902, determination is made as to whether resumption from the LPI of the EEE is made. To be more specific, confirmation is made as to whether the EEE setting is effective, and if so, the resumption from the LPI is determined to be made, and the process proceeds to Step 903. Meanwhile, if the EEE setting is not effective (in the case where the EEE setting is disabled or in the case where the hub 120 as a counter apparatus is not adapted to the EEE), the process proceeds to Step 908. In the case of resumption from the LPI, packet pattern detection processing is made on a reception packet in Step 903. In this pattern detection processing, a pattern indicating an activation signal stored in the ROM 402 in advance (hereinafter referred to as a "WOL pattern") and a pattern of a packet received from the network 112 are compared to check whether they are identical with each other. As a transport protocol between the PC 110 and the MFP 100, a transmission control protocol (TCP) is typically used. The TCP has the structure of Ethernet header, IP header, TCP header, and TCP payload. The pattern detection processing is made by using information in the TCP header.

In Step 904, determination is made as to whether the pattern of the reception packet is identical to the WOL pattern. In the case where the reception packet pattern is identical to the WOL pattern, the process proceeds to Step 905. Meanwhile, in the case where the reception packet pattern is not identical to the WOL pattern, the packet is determined to be irrelevant to the processing of the network interface 305 (the sub-CPU 401) and this process is terminated.

In Step 905, activation of the main CPU 301 is instructed to the power control unit 201. As a result, power is supplied to the main CPU 301, and the main CPU 301 starts activation. Thereafter, in Step 906, the reception packet is transferred to the main CPU 301. The transferred reception packet is analyzed by the main CPU 301, and if it represents a print job, the main CPU 301 instructs the power control unit 201 to supply power to the print unit 104. Then, the power is supplied to the print unit 104 by the power control unit 201 to activate the printer engine, thereby making a transition to the standby mode. Alternatively, if the packet represents an inquiry job or the like which is not associated with printing processing, a transition is made to the wait-and-respond mode which does not require activation of the printer engine. Then, in Step 907, the setting to end the LPI is made for the MAC 405. As a result, the MFP 100 makes a transition from the S3 state to the S0 state.

In Step 908 where resumption from the LPI is determined not to be made, pattern detection processing is performed on the reception packet as in Step 903 above. Then, in Step 909, isolation of processing is made by determining whether the pattern of the reception packet is identical to the WOL pattern. In the case where the reception packet pattern is identical to the WOL pattern, the process proceeds to Step 910. Meanwhile, in the case where the reception packet pattern is not identical to the WOL pattern, the packet is determined to be irrelevant to the processing of the network interface 305 (the sub-CPU 401) and this process is terminated.

In Step 910, determination is made as to whether a destination port number of the reception packet indicates "9100," which refers to a print job. This determination is also made based on the TCP header. The TCP header has the structure of a transmission source (start point) port number, a destination (end point) port number, a sequence number, a confirmation response number, and so on. Here, the transmission source port number indicates a port number on the side of transmitting a packet (the PC 110 side herein), whereas the destination port number indicates a port number on the side of receiving a packet (the MFP 100 side herein). Both the transmission source port number and destination port number have two-byte information. Moreover, the destination port number is defined in an application or the like, and "9100" is assigned as a number representing printing processing. Accordingly, a destination port number is confirmed to distinguish whether a received packet relates to a print job or not. If the destination port number of the TCP header of the reception packet is "9100," the process proceeds to Step 911. Meanwhile, if the destination port number of the TCP header of the reception packet is not "9100," the process proceeds to Step 915.

In Step 911, the activation of the main CPU 301 and the print unit 104 is instructed to the power control unit 201. As a result, the power is supplied to the main CPU 301 and the print unit 104 and activation processing is made for both units. In subsequent Step 912, the setting of a communication speed for the PHY 404 is changed from the lowest speed in the sleep mode to the highest speed. For instance, in the case where the PHY 404 is adapted to three types of communication speeds, that is, 1000 Mbps, 100 Mbps, and 10 Mbps, the setting is changed from the lowest speed of 10 Mbps to the highest speed of 1000 Mbps. Thereafter, once the auto-negotiation is performed (Step 913) and completed, reception packet data is transferred to the main CPU 301 at the same maximum speed for the PHY 404 and the PHY 411 (Step 914). In the case where the PHY 411 is also adapted to three types of communication speed, that is, 1000 Mbps, 100 Mbps, and 10 Mbps, the communication speed is returned to 1000 Mbps to ensure a communication band of the network 112, and after receiving the packet completely from the PC 110, the reception packet is transferred to the main CPU 301. The transferred reception packet is analyzed by the main CPU 301. As described above, in the case where a destination port number of the reception packet is "9100," control is made so as to start activation processing of the printer engine prior to the packet analysis by the main CPU 301.

In Step 915, as in Step 905, activation of the main CPU 301 is instructed to the power control unit 201. As a result, power is supplied to the main CPU 301, and the main CPU 301 starts activation. Thereafter, in Step 916, the reception packet data is transferred to the main CPU 301. The transferred reception packet is analyzed by the main CPU 301, and if it includes a print job, power is supplied to the print unit 104 by the power control unit 201 who received the instruction from the main CPU 301. As a result, activation processing of the printer engine is to be started.

In Step 917 where the operation mode is determined to be the wait-and-respond mode or the standby mode (S0 state), the reception packet is transferred to the main CPU 301 and processed by the main CPU 301.

As described above, in packet reception processing according to the present embodiment, on a condition that the EEE is enabled, the main CPU 301 is firstly activated, and in the main CPU 301, the analysis of the reception packet and a series of job processing including activation control of the print unit 104 in accordance with the result of the analysis are made. Meanwhile, on a condition that the EEE is disabled, the sub-CPU 401 determines whether or not to activate the print unit 104 based on a port number included in the reception packet and gives an activation instruction, if required, and then, the analysis of the reception packet is made in the main CPU 301. At the time of resumption from the sleep mode, such processing of the reception packet allows optimizing the balance between power reduction during the standby state and time reduction in resume processing.

Incidentally, according to the present embodiment, the MFP has been exemplified for the explanation, but the present invention is not limited to this, and is widely applicable to printing apparatuses (image forming apparatuses) used in networks.

Second Embodiment

In the packet reception processing of the first embodiment, the packet analysis having a high processing load has been made by the main CPU 301 instead of by the network interface 305. Next, a form of processing up to the packet analysis within the network interface 305 will be explained as the second embodiment. It should be noted that the content common to the first embodiment will be omitted, and packet reception processing, which includes a different aspect, will be mainly explained below.

Figure 10:
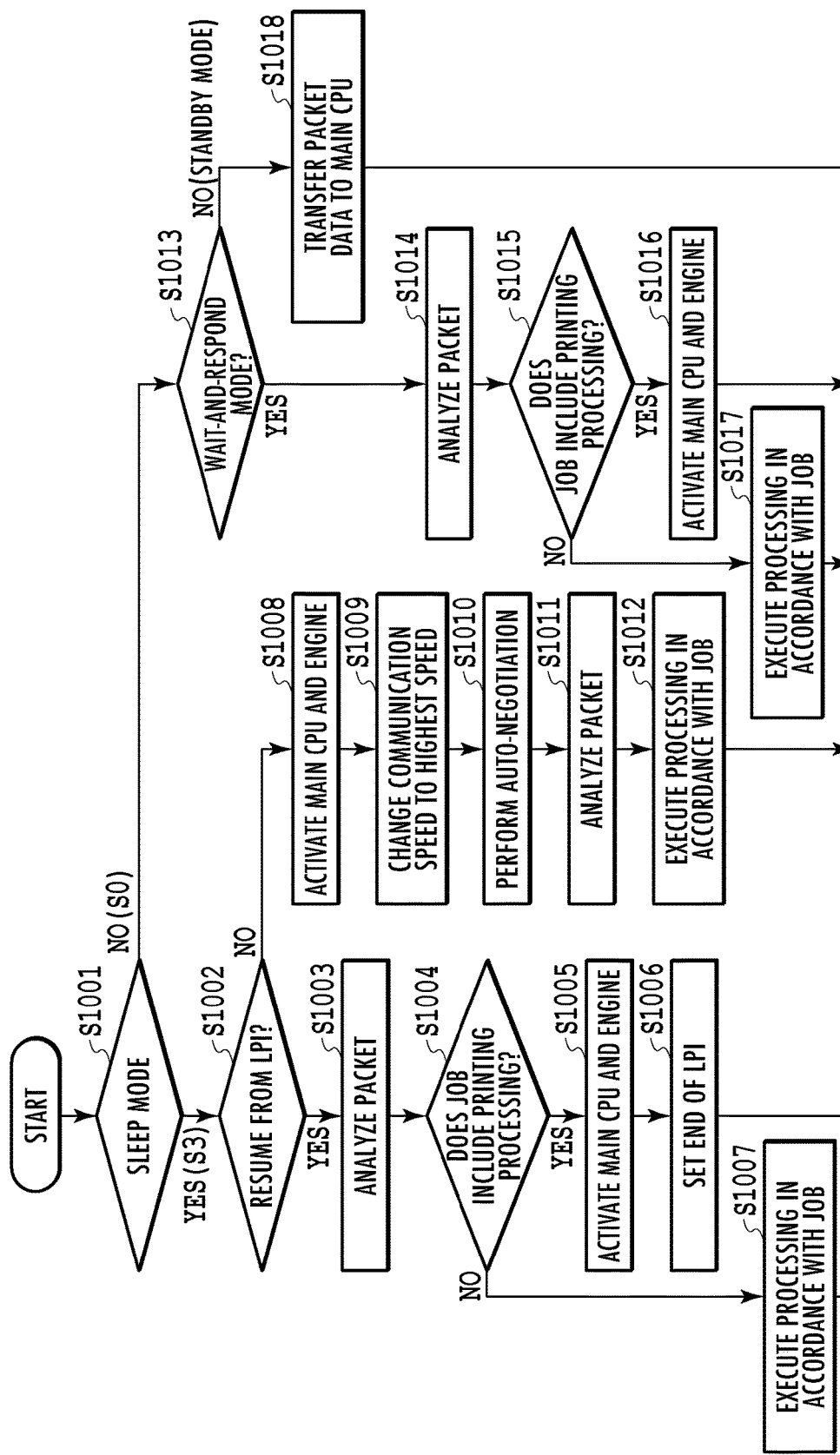
FIG. 10 is a flowchart showing the details of packet reception processing according to a second embodiment.

FIG. 10 is a flowchart showing the details of packet reception processing according to the present embodiment. The details will be explained below along the flow shown in FIG. 10.

First of all, in Step 1001, determination is made as to whether the operation mode is the sleep mode (S3 state). If the operation mode is the sleep mode, the process proceeds to Step 1002. Meanwhile, if the operation mode is other than the sleep mode, that is, either the wait-and-respond mode or the standby mode (S0 state), the process proceeds to Step 1013.

In Step 1002, determination is made as to whether resumption is made from the LPI (whether the EEE setting is effective). If the EEE setting is effective, the process proceeds to Step 1003. Meanwhile, if the EEE setting is not effective, the process proceeds to Step 1008.

In Step 1003, the analysis of the received packet is made. In other words, the reception packet is analyzed by the sub-CPU 401 in the network interface 305 without being transferred to the main CPU 301. Then, in Step 1004, isolation of processing is made based on the result of the analysis. As a result of the packet analysis, if there is a job including printing processing (which requires activation of the printer engine), the process proceeds to Step 1005, and activation of the main CPU 301 and the print unit 104 is instructed to the power control unit 201. As a result, the power is supplied to the main CPU 301 and the print unit 104 and activation processing is made for both units. Then, in Step 1006, the setting to end the LPI is made for the MAC 405. As a result, the MFP 100 makes a transition from the S3 state to the S0 state. Meanwhile, as a result of the packet analysis, if there is a job not including printing processing (which requires no activation of the printer engine) (NO in Step 1004), the process proceeds to Step 1007, and processing in accordance with a job content is made. In other words, a response is returned by the sub-CPU 401, or reception packet data is transferred to the main CPU 301 to request subsequent processing.

In Step 1008 where resumption from the LPI is determined not to be made, activation of the main CPU 301 and the print unit 104 is instructed to the power control unit 201 upon a trigger of the packet reception. As a result, the power is supplied to the main CPU 301 and the print unit 104 and activation processing is made for both units. In subsequent Step 1009, the setting of a communication speed for the PHY 404 is changed from the lowest speed in the sleep mode to the highest speed. Thereafter, through the auto-negotiation (Step 1010), the analysis of the received packet is made (Step 1011). Then, as in Step 1007, processing in accordance with a job content is made (Step 1012).

In Step 1013 where the operation mode is determined not to be the sleep mode, determination is made as to whether the operation mode is either the wait-and-respond mode or the standby mode. If the operation mode is the wait-and-respond mode, the process proceeds to Step 1014. Meanwhile, if the operation mode is the standby mode, the process proceeds to Step 1018.

First of all, in Step 1014 in the case of the wait-and-respond mode, the analysis of the reception packet is made. Then, in Step 1015, isolation of processing is made based on the result of the analysis. In other words, if the reception packet has a job including the printing processing, the process proceeds to Step 1016, and activation of the main CPU 301 and the print unit 104 is instructed to the power control unit 201. As a result, the power is supplied to the main CPU 301 and the print unit 104 and activation processing is made for both units. Meanwhile, as a result of the packet analysis, if a job does not include printing processing, the process proceeds to Step 1017, and as in Steps 1007 and 1012, processing in accordance with a job content is made. Alternatively, in Step 1018 in the case of the standby mode (NO in Step 1013), reception packet data is transferred to the main CPU 301. The transferred reception packet is analyzed by the main CPU 301 and processing in accordance with the result of the analysis is made.

As described above, in the packet reception processing of the present embodiment, on a condition that the EEE setting is effective, and in consideration of a time period required for resumption from the LPI being short, the reception packet is analyzed in the network interface 305 and based on such a result, activation control of the print unit 104 is made. Meanwhile, on a condition that the EEE setting is not effective, and in consideration of the time of about a few seconds being required for resumption, upon the packet reception as a trigger, the print unit 104 is activated in advance and then the packet is analyzed. As a result, as in the first embodiment, it is possible to make control such that power reduction during the standby state in the sleep mode and time reduction in resume processing are well balanced.

Third Embodiment

In the second embodiment, assuming that the processing up to the packet analysis is made in the network interface 305, the form of dynamically changing the order of the activation of the printer engine and the packet analysis in accordance with whether the EEE setting is effective at the time of resumption from the sleep mode is adopted. Particularly, at the time at which the EEE setting is not effective, control is made so as to analyze a packet after activating the print unit 104, thereby suppressing time required for the entire processing. Next, as in the second embodiment, the processing up to the packet analysis is made in the network interface 305, and on a condition that the EEE setting is not effective, as in the first embodiment, a form of changing the processing order thereafter based on a destination port number of the reception packet will be explained as the third embodiment. It should be noted that the contents common to the first and second embodiments will be omitted, and packet reception processing, which includes a different aspect, will be mainly explained below.

Figure 11:
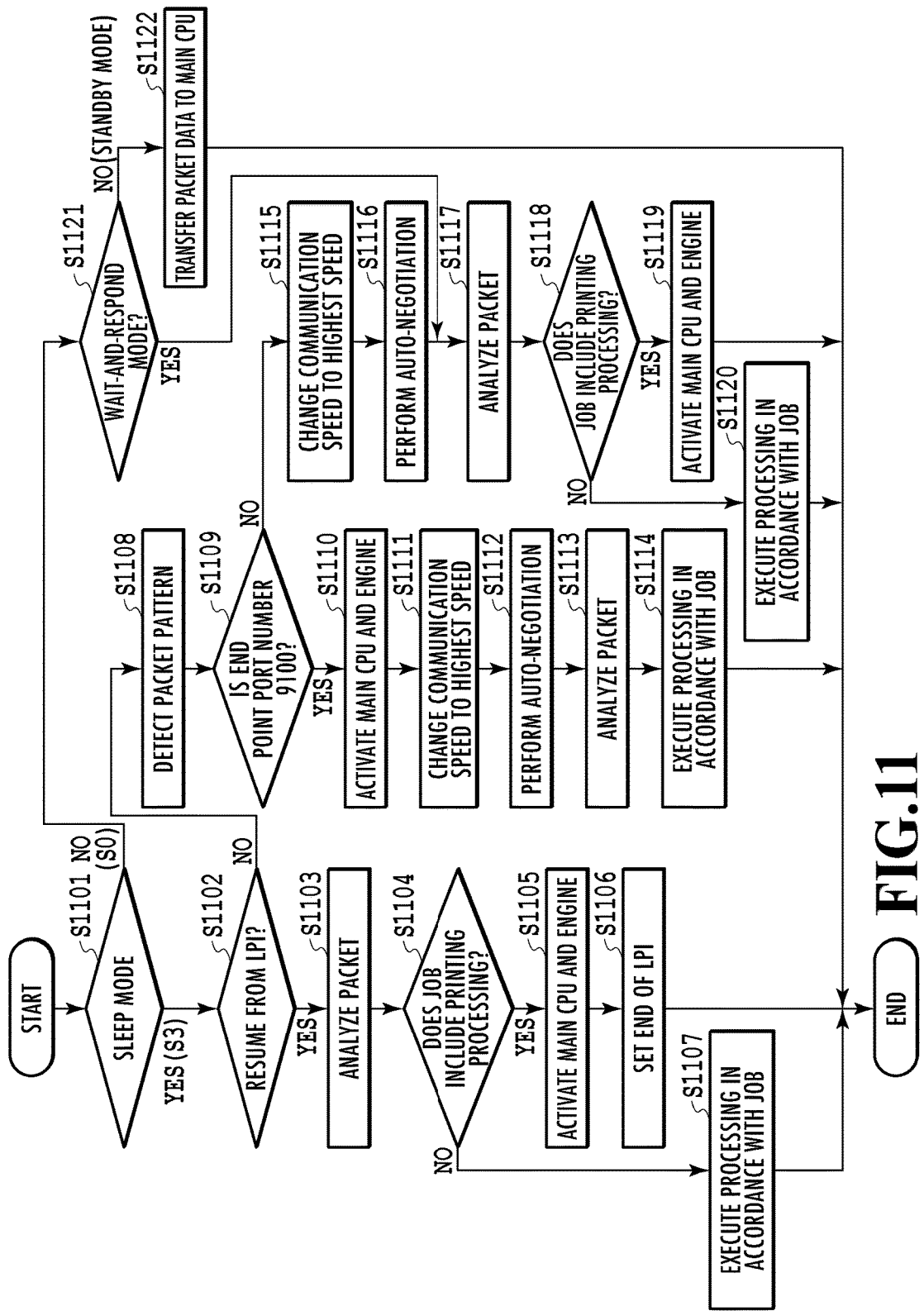
FIG. 11 is a flowchart showing the details of packet reception processing according to a third embodiment.

FIG. 11 is a flowchart showing the details of packet reception processing according to the present embodiment. According to the present embodiment, in the case where the EEE setting is not effective at the time of resumption from the sleep mode and if a destination port number of the reception packet is "9100," the print unit 104 is firstly activated, and then, the communication speed is returned to make the packet analysis and processing is made in accordance with the result of the analysis. Further, if the destination port number of the reception packet is not "9100," the communication speed is firstly returned and then the packet analysis is made, and if there is a job that requires printing processing as the result of the analysis, the print unit 104 is activated. The details will be explained below along the flow shown in FIG. 11.

Step 1101 through Step 1107 are identical to Steps 1001 through 1007 in the flow shown in FIG. 10 of the second embodiment, and therefore, an explanation will be omitted.

In Step 1108 where resumption from the LPI is determined not to be made (NO in Step 1102), as in Step 908 in the flow shown in FIG. 9 of the first embodiment, pattern detection processing is made on the reception packet. In subsequent Step 1109, as in Step 910 in the flow shown in FIG. 9 of the first embodiment, determination is made as to whether a destination port number of the reception packet indicates "9100," which refers to a print job. If the destination port number of the reception packet is "9100," the process proceeds to Step 1110. Meanwhile, if the destination port number of the reception packet is not "9100," the process proceeds to Step 1115.

Each processing in Steps 1110 through 1114 in the case where the destination port number is "9100" corresponds to each processing in Steps 1008 thought 1012 in the flow shown in FIG. 10 of the second embodiment. In other words, activation of the main CPU 301 and the print unit 104 is instructed to the power control unit 201 and activation processing is made for both units (Step 1110). Next, the setting of a communication speed for the PHY 404 is changed to the highest speed (Step 1111). Then, through the auto-negotiation (Step 1112), analysis processing for the received packet is made (Step 1113), and processing in accordance with a job content is made (Step 1114).

In the case where the destination port number is not "9100," the setting of a communication speed for the PHY 404 is firstly changed to the highest speed (Step 1115), and then the auto-negotiation is performed (Step 1116). Each processing in subsequent Steps 1117 through 1120 corresponds to each processing in Steps 1014 through 1017 in the flow shown in FIG. 10 of the second embodiment. In other words, the analysis of the reception packet is made (Step 1117), and if the reception packet has a job including printing processing, the activation of the main CPU 301 and the print unit 104 is instructed to the power control unit 201, and activation processing is made for both units (Step 1119). Meanwhile, as a result of the packet analysis, if a job does not include printing processing, processing in accordance with a job content is made (Step 1120).

Alternatively, in the case where the operation mode is the wait-and-respond mode (YES in Step 1121), each processing in the above Steps 1117 through 1120 is also made. Moreover, in the case where the operation mode is neither the sleep mode nor the wait-and-respond mode (NO in both Steps 1101 and 1121), but is the standby mode, reception packet data is transferred to the main CPU 301 as in Step 1018 in the second embodiment (Step 1122).

As described above, in the packet reception processing of the present embodiment, determination is made as to whether or not to activate the printing engine based on a destination port number in the case where the EEE setting is not effective. As a result, the printer engine can be activated in an early stage only for a job that requires printing processing which requires activation of the printer engine, and more accurate control compared to the second embodiment can be achieved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a printing apparatus including an EEE function, activation control of a printer engine upon resumption from a power saving mode can be efficiently made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-235026 filed Dec. 2, 2016, which is hereby incorporated by reference wherein in its entirety.

What is claimed is:

1. A printing apparatus comprising:
    a printer engine;
    a network interface which can change a link speed, and which receives data from an external apparatus;
    a first controller which controls communication with the network interface;
    a second controller which controls power supply to the printer engine and the first controller,
    wherein
    the first controller causes the printing apparatus to make a transition to a first sleep state or a second sleep state,
    the first sleep state is a sleep state in which the second controller stops power supply to the first controller and the printer engine, and the link speed of the network interface is a first link speed,
    the second sleep state is a sleep state in which the second controller stops power supply to the first controller and the printer engine, and the link speed of the network interface is a second link speed lower than the first link speed, and
    the second controller
    in a case where the printing apparatus is in the first sleep state, supplies power to the first controller by receiving data from the external apparatus, and
    in a case where the printing apparatus is in the second sleep state, supplies power to the first controller and the printer engine by receiving data from the external apparatus.

2. The printing apparatus according to claim 1, wherein the network interface in a case where the printing apparatus is in a normal operation state, communicates with the external apparatus in the first link speed,
in a case where the printing apparatus is in the first sleep state, communicates with the external apparatus in the first link speed and is in a power-saving state in which power is saved compared to power in the normal operation state, and
in a case where the printing apparatus is in the second sleep state, communicates with the external apparatus in the second link speed and is in the power-saving state in which power is saved compared to power in the normal operation state.

3. The printing apparatus according to claim 2, wherein the first controller causes the printing apparatus to make a transition from the normal operation state to the first sleep state or the second sleep state based on a transition condition to the power-saving state of the printing apparatus.

4. The printing apparatus according to claim 3, wherein the transition condition to the power-saving state of the printing apparatus is determined by whether an EEE setting in the printing apparatus is effective or not and whether an EEE setting in the external apparatus is effective or not.

5. The printing apparatus according to claim 1, further comprising a comparison unit configured to compare a pattern indicating an activation signal with a predetermined pattern, wherein
in a case where the printing apparatus is in the first sleep state, the comparison unit compares a pattern of data received by the network interface from the external apparatus with the pattern indicating the activation signal, and
in a case where the comparison by the comparison unit shows that the pattern of the received data and the pattern indicating the activation signal are identical, the second controller supplies power to the first controller and then supplies power to the printer engine.

6. The printing apparatus according to claim 5, wherein
in a case where the printing apparatus is in the second sleep state, and receives data from the external apparatus via a reception port indicating printing in the network interface, the second controller supplies power to the first controller and the printer engine.

7. The printing apparatus according to claim 6, wherein
in a case where the printing apparatus is in the second sleep state, and receives data from the external apparatus not via the reception port indicating printing in the network interface, the comparison unit compares the pattern of the data received from the external apparatus with the pattern indicating the activation signal, and
in a case where the comparison by the comparison unit shows that the pattern of the received data and the pattern indicating the activation signal are identical, the second controller supplies power to the first controller and then supplies power to the printer engine.

8. The printing apparatus according to claim 6, wherein the reception port indicating printing in the network interface is a port 9100.

9. The printing apparatus according to claim 1, wherein
in a case where the printing apparatus is in the second sleep state, and receives data from the external apparatus via the reception port indicating printing in the network interface, the second controller supplies power to the first controller and the printer engine.

10. The printing apparatus according to claim 9, further comprising a comparison unit configured to compare a pattern indicating an activation signal with a predetermined pattern, wherein
- in a case where the printing apparatus is in the second sleep state, and receives data from the external apparatus not via the reception port indicating printing in the network interface, the comparison unit compares a pattern of data received from the external apparatus with the pattern indicating the activation signal, and
- in a case where the comparison by the comparison unit shows that the pattern of the received data and the pattern indicating the activation signal are identical, the second controller supplies power to the first controller and then supplies power to the printer engine.

11. The printing apparatus according to claim 9, wherein the reception port indicating printing in the network interface is a port 9100.

12. A control method of a printing apparatus, wherein the printing apparatus comprises:
- a printer engine;
- a network interface which can change a link speed, and which receives data from an external apparatus;
- a first controller which controls communication with the network interface; and
- a second controller which controls power supply to the printer engine and the first controller, the control method comprising the steps of:
- controlling the first controller to transition the printing apparatus to a first sleep state or a second sleep state,
- the first sleep state is a sleep state in which the second controller stops power supply to the first controller and the printer engine, and the link speed of the network interface is a first link speed,
- the second sleep state is a sleep state in which the second controller stops power supply to the first controller and the printer engine, and the link speed of the network interface is a second link speed lower than the first link speed,
- controlling the second controller, in a case where the printing apparatus is in the first sleep state, to supply power to the first controller by receiving data from the external apparatus, and
- controlling the second controller, in a case where the printing apparatus is in the second sleep state, to supply power to the first controller and the printer engine by receiving data from the external apparatus.

13. The control method according to claim 12, further comprising the step of controlling the network interface to:
- in a case where the printing apparatus is in a normal operation state, communicate with the external apparatus in the first link speed,
- in a case where the printing apparatus is in the first sleep state, communicate with the external apparatus in the first link speed, and is in a power-saving state in which power is saved compared to power in the normal operation state, and
- in a case where the printing apparatus is in the second sleep state, communicate with the external apparatus in the second link speed, and is in the power-saving state in which power is saved compared to power in the normal operation state.

14. The control method according to claim 13, wherein the transition condition to the power-saving state of the printing apparatus is determined by whether an EEE setting in the printing apparatus is effective or not and whether an EEE setting in the external apparatus is effective or not.

15. The control method according to claim 12, further comprising the step of controlling the first controller to transition the printing apparatus from the normal operation state to the first sleep state or the second sleep state based on a transition condition to the power-saving state of the printing apparatus.

16. The control method according to claim 12, wherein the printing apparatus including a comparison unit configured to compare a pattern indicating an activation signal with a predetermined pattern, and further comprising the steps of:
- in a case where the printing apparatus is in the first sleep state, controlling the comparison unit to compare a pattern of data received by the network interface from the external apparatus with the pattern indicating the activation signal, and
- in a case where the comparison by the comparison unit shows that the pattern of the received data and the pattern indicating the activation signal are identical, controlling the second controller to supply power to the first controller and then supply power to the printer engine.

17. The control method according to claim 16, wherein
- in a case where the printing apparatus is in the second sleep state, and receives data from the external apparatus via a reception port indicating printing in the network interface, the second controller is controlled to supply power to the first controller and the printer engine.

18. The control method according to claim 17, wherein
- in a case where the printing apparatus is in the second sleep state, and receives data from the external apparatus not via the reception port indicating printing in the network interface, the comparison unit is controlled to compare the pattern of the data received from the external apparatus with the pattern indicating the activation signal, and
- in a case where the comparison by the comparison unit shows that the pattern of the received data and the pattern indicating the activation signal are identical, the second controller is controlled to supply power to the first controller and then supply power to the printer engine.

19. The control method according to claim 17, wherein
- in a case where the printing apparatus is in the second sleep state, and receives data from the external apparatus via the reception port indicating printing in the network interface, the second controller is controlled to supply power to the first controller and the printer engine.

20. The control method according to claim 19, wherein the printing apparatus includes a comparison unit configured to compare a pattern indicating an activation signal with a predetermined pattern, and further comprising the steps of:
- in a case where the printing apparatus is in the second sleep state, and receives data from the external apparatus not via the reception port indicating printing in the network interface, controlling the comparison unit to compare a pattern of data received from the external apparatus with the pattern indicating the activation signal, and
- in a case where the comparison by the comparison unit shows that the pattern of the received data and the pattern indicating the activation signal are identical, controlling the second controller to supply power to the first controller and then supply power to the printer engine.

21. The control method according to claim 19, wherein the reception port indicating printing in the network interface is a port 9100.

22. The control method according to claim 17, wherein the reception port indicating printing in the network interface is a port 9100.

23. A non-transitory computer readable storage medium storing a program for causing a computer to perform a control method of a printing apparatus, wherein the printing apparatus comprises:
   a printer engine;
   a network interface which can change a link speed, and which receives data from an external apparatus;
   a first controller which controls communication with the network interface; and
   a second controller which controls power supply to the printer engine and the first controller,
   the control method comprising the steps of:
   controlling the first controller to transition the printing apparatus to a first sleep state or a second sleep state,
   the first sleep state is a sleep state in which the second controller stops power supply to the first controller and the printer engine, and the link speed of the network interface is a first link speed,
   the second sleep state is a sleep state in which the second controller stops power supply to the first controller and the printer engine, and the link speed of the network interface is a second link speed lower than the first link speed,
   controlling the second controller, in a case where the printing apparatus is in the first sleep state, to supply power to the first controller by receiving data from the external apparatus, and
   controlling the second controller, in a case where the printing apparatus is in the second sleep state, to supply power to the first controller and the printer engine by receiving data from the external apparatus.

* * * * *